Oct. 31, 1961  N. W. BURLIS ET AL  3,006,336
SERVO-SPIROMETER

Filed July 22, 1957  2 Sheets-Sheet 1

INVENTORS
NORBERT W. BURLIS
MILTON J. REINERT
BY *Frank Groom Kirtz*
ATTORNEY

Oct. 31, 1961   N. W. BURLIS ET AL   3,006,336
SERVO-SPIROMETER
Filed July 22, 1957   2 Sheets-Sheet 2

INVENTORS
NORBERT W. BURLIS
MILTON J. REINERT
BY
ATTORNEY

3,006,336
SERVO-SPIROMETER
Norbert W. Burlis, St. Louis, and Milton J. Reinert, Ferguson, Mo., assignors to Custom Engineering and Development Co., a corporation of Missouri
Filed July 22, 1957, Ser. No. 673,441
10 Claims. (Cl. 128—2.08)

The principal object of this invention is to provide a spirometer or volume and flow testing apparatus which does not place a "load" on the testee's lungs. Formerly the spirometer used for testing the user's lung performance consisted of an expansible chamber having an inertia and a friction level which must be overcome directly by the user's lung effort. Normal breathing however consists of unloaded breathing, that is, breathing directly into the atmosphere. Thus the ordinary spriometer does not measure normal breathing characteristics. The very act of measuring introduces a change in the characteristics being measured. With the servo-spirometer the inertia and friction level of the instrument are not of effect on the breathing characteristics. The motive power to overcome the inertia and friction level of the instrument is supplied by an electric motor and clutch assembly and controlled by servo loops responsive to pressure changes from the user's lungs. These pressure changes are of negligible order compared to those required to drive an ordinary spirometer. Thus the servo controls supply the energy to drive the measuring apparatus and although the user is breathing into a confined volume, his breathing characteristics are those of normal breathing into the atmosphere.

Another object is to provide a spirometer which can measure transient conditions in the user's breathing cycle. The ordinary spirometer cannot measure transient conditions because they are masked by the inertia effect of the expansible chamber. The ordinary spirometer can measure the characteristics of quiet breathing of a testee reclining during a basal metabolism test. However there has not previously been an instrument which could follow and measure breathing characteristics during exercise, as for instance during running on a treadmill, breathing in pants, breathing while coughing and so forth. All of these conditions are a part of normal breathing but they have hitherto been beyond the measuring capacity of the spirometer. With the servo-spirometer these conditions can be studied with great accuracy. The study of these characteristics is important in the evalution of the capabilities and discrepancies of the testee's lungs.

Another object of this invention is to provide a spirometer which measures extremely light lung effects. With the servo-spirometer it is now possible to measure the lung characteristics of newly born infants whose breathing characteristics are masked by the loading effect of the ordinary spirometer. It is even possible to extend the measurement of lung characteristics to new ranges, i.e. to measure the breathing characteristics of very small animals, as well as those of patients suffering from a variety of lung disorders which disable them from developing sufficient power to drive an ordinary spirometer.

A further object of this invention is to provide a spirometer which will measure lung characteristics against constant definitive resistive pressures. An attempt to accomplish this aim with the ordinary spirometer can be made by placing an additional weight on the expansible chamber, in which case the resistive pressures vary with the breathing, due to accelerations of the additional weight. In the servo-spirometer, this aim is accomplished by supplying a reference pressure other than atmospheric to the pressure transducer. In this manner the servo controls will maintain the chamber of the servo-spirometer at the required pressure other than atmospheric during breathing from the user.

Another object of this invention is to provide a spirometer which can act as an aid or "booster pump" for the breathing of a patient suffering impairment of lung function. Thus a patient whose lungs can only weakly provide pressure changes can impress his pattern of breathings on the servo-spirometer while the machine, in synchronization varying with the patient's changing pattern, can supply the energy to do the patient's breathing for him. Extremely slight variations in pressure of breathing suffice to control the machine. For example, polio or tubercular patients, who desire to cough, but who have lost the lung capability to do so, can by using the servo-spirometer be aided in performing this function.

A further related object of this invention is to provide a spirometer which can utilize booster pump action controlled and metered by the changing breathing pattern of the patient to supply anesthesia in synchronization with said changing breathing pattern.

A further object of this invention is to provide a spirometer which can supply direct measurement of flow from the user's lungs. The rate of change of volume as well as the volume measurement is available independently. Rate of change of volume data is not converted into volume data by means of electronic integrators. In the past these measurements have been made by drift-susceptible electronic integrators or laborious mechanical integration techniques such as employing planimeters to measure the areas under complex curves representing volume rate of change.

Another object of this invention is to provide a simple means of integrating unidirectional flow of air, from or into, the patient's lungs. For studies of maximal breathing capacity, it is desirable to sum the total unidirectional volume of gas breathed in a unit interval of time, such as a fifteen second period. The performance of this measurement requires a relatively laborious summation from the records of volumes if bidirectional volumes are recorded. By incorporating a slip disc in the servo-spirometer assembly it is possible to read out summation of unidirectional flow.

Another object of this invention is to provide a spirometer which can utilize an electrically-controlled system of valving to produce low-resistance valving which is useful for closed system lung studies. This is done by representing the velocity parameters by proportional signals available from a tachometer loop. These signals operate a valve whose position is dependent upon the direction of flow of gas in and out of the spirometer chamber.

An additional object of this invention is to provide a spirometer which can permit the use of a resistive element in series with the patient's breathing without loading the patient's lungs. For instance, if it is desired to place an absorption tube for carbon dioxide in the path of the air from the patient to the servo-spirometer's expansible chamber, it is possible to do this and yet have the patient breathe as if he were breathing to atmospheric pressure.

A final object of this invention is to provide a spirometer which unloads the patient's lungs, and moreover has sufficient reserve of power to operate a variety of take-offs and read-outs such as mechanical kymographs, integrating potentiometers and the like without placing an additional load on the patient's lungs.

Further objects and advantages of our servo-controlled piston, responsive to pressure changes in the cylinder associated therewith and automatically compensating therefor as well as other uses of said instrument, will be apparent from the following description, considered in connection with the accompanying drawings, which form part of this specification, and of which:

Figure 1:
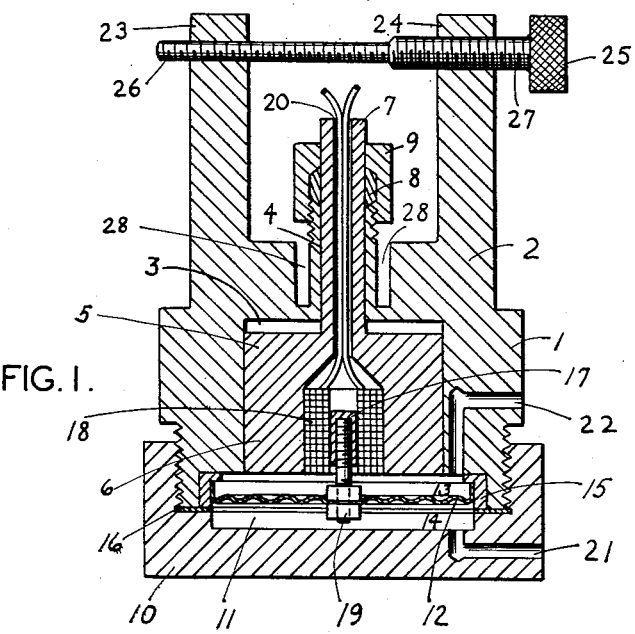
FIG. 1 is a longitudinal cross-sectional view of the pressure transducer of the servo-spirometer.

Referring to FIG. 1, the pressure transducer 1 consists of a brass cylinder having a U-shaped portion 2, projecting from the base of the cylinder and integral therewith. The cylinder is provided with a cylindrical bore 3, communicating with a counterbore 4. Slidably disposed in bore 3 and counterbore 4 is a plexiglass transformer mount 5 in the form of a cylinder 6 provided with a projecting tube 7 integral therewith. However the tube 7 is rigidly mounted and sealed to the U-shaped portion 2, by means of a compression ring and nut 8 and 9 respectively.

A cap 10 of brass is threadably disposed upon the open end of the brass cylinder 1. A chamber 11 is formed by matching internal bores in the cap 10 and the transducer body 1. A metal diaphragm 12 is disposed to divide the chamber 11 into upper and lower compartments, 13 and 14 respectively. The metal diaphragm 12 is soldered rigidly to a brass ring 15 which is sealed against the outer peripheral cylindrical wall of the chamber 11 by the neoprene torus 16. The iron core 17 of a linear variable differential transformer, the Schaevitz type, 18 is mounted integrally with the center of the circular metal diaphragm 12 by a plexiglass fastener 19. The core 17 is slidably disposed within the core opening of the Schaevitz transformer. An access channel 20 is provided in the transformer mount 5 for the leadout wires of the excitation and take-off circuits of the transformer windings.

Pressure inlets 21 and 22 are provided in the pressure transducer. Inlet 21 is provided in the wall of the end cap 10 and offers communication between the lower compartment 14 of the chamber 11 and the spirometer chamber, as a measure of the varying pressure in the spirometer chamber.

Pressure inlet 22 is provided in the wall of the transducer body offering communication between the upper compartment 13 of the chamber 11 and the fixed pressure reference, which is ordinarily atmospheric pressure but which may be maintained at a higher or lower pressure than atmospheric.

A differential of pressure between the sources of the two pressure inlets 21 and 22 produces a movement in the diaphragm 12 which is transmitted to the core 17 of the Schaevitz. When excitation is provided to the Schaevitz, relative motion between the core 17 and the transformer 18 will be converted into an electric signal detectable in the output leads of the Schaevitz. Thus a signal is obtained from the Schaevitz which is proportional to the pressure difference.

The two ends 23, 24 of the U-shaped portion 2 are capable of a relative flexing movement. Said flexing is controlled by an adjusting screw 25 piercing both of the ends 23, 24. Adjusting screw 25 is composed of two threaded sections, 26 and 27 respectively. The number of threads per unit length of 26 is slightly smaller than the number per unit length of 27. Thus for a given number of radians of rotation in one direction of the adjusting screw, the one end of the screw will move through its end of the U-shaped portion faster than the other end of the screw will move through its corresponding end of the U-shaped portion. This effect will pull the ends 23, 24 toward each other. Relief slots 28, 28 are channelled in the U-shaped portion 2 to lessen the amount of force required of the adjusting screw 25 to produce the relative flexing of the ends 23, 24.

Movement of the ends towards each other produces stresses in the U-shaped portion 2 which cause the transformer mount 5 to move toward the diaphragm 12. Conversely movement of the ends 23, 24 away from each other, by reversal of the motion of the adjusting screw 25, causes the transformer mount 5 to move away from the diaphragm 12. In this manner the signal output from the Schaevitz transformer can be "nulled" or zeroed, for a given displacement of the diaphragm.

Figure 2:
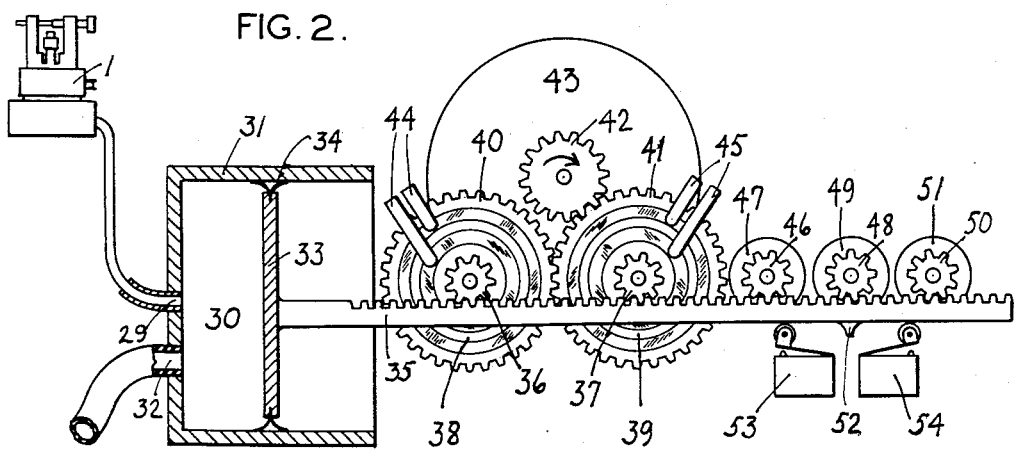
FIG. 2 is a view, partly in elevation and partly in section showing the arrangement of the system physically, together with associated servo-control equipment.

The pressure transducer inlet 21 communicates with the spirometer pressure outlet 29 of FIGURE 2. This outlet is provided in the end of the cylindrical spirometer chamber or volume comparator 30. In this spirometer end 31 is also provided the user's or testee's facial mask inlet 32, through which the patient breathes to introduce his lung volume changes being measured. A conventional facial mask is worn by the patient and attached to the facial mask inlet 32. All of the patient's air, expired and inspired, is passed through the facial mask and the inlet 32, in the conventional manner during the test.

The piston 33, provided with piston ring 34 in the form of an inset neoprene wiper, rides upon, and is driven by the rack gear 35. Meshing at all times with the rack gear 35 are the two pinions 36 and 37. The pinions are mounted upon the output shafts of the magnetic clutches 38 and 39 respectively. Gears 40 and 41 are intermeshed and mounted rotatably on the housings of the magnetic clutches 38 and 39 respectively. Pinions 36 and 37, together with clutches 38 and 39, and gears 40 and 41, constitute two units available from Lear, Inc., of Grand Rapids, Michigan, as two of their production model 900AB Magnetic Clutches. Gear 41 is driven at constant speed by a pinion gear 42 mounted on the shaft of the motor 43. Two pairs of brushes, 44, 44 and 45, 45 respectively are provided for control of the magnetic clutches through their commutators.

A pinion gear 46 is meshed at all times with the rack gear 35 and mounted rotatably upon the input shaft of a tachometer 47 which is a Model SA-740B-1, D.C. Tachometer supplied by the Servo-Tek Products Co. of Hawthorne, New Jersey.

Further, a pinion 48 is meshed at all times with the rack gear 35 as a takeoff for the drive of a potentiometer 49 which is a Type 743-C Potentiometer, manufactured by the Fairchild Controls Corp. of Hicksville, Long Island, N.Y. Similarly a pinion 50 is meshed at all times with the rack gear 35, pinion 50 connects to the integrator potentiometer 51 which also is a Type 743-C Potentiometer from Fairchild Controls Corp. like potentiometer 49, through a slip disc, not shown.

Upon the underside of the rack gear and integral therewith is the cam 52, operative at either end of the travel of the rack gear 35 driving the piston, to close the electrical limit switches 53, 54.

Figure 3:
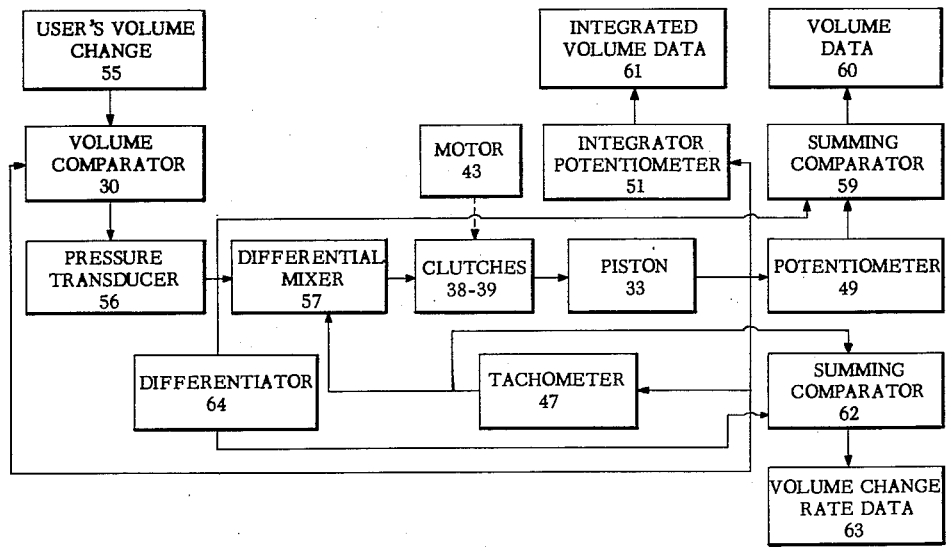
FIG. 3 is a schematic block diagram illustrating in detail the circuit relationships of the instrument.

In FIG. 3 we show the operation of the servo-spirometer by schematic block diagrams. Numeral 55 denotes the block entitled as user's volume change. This can be considered as the volume of air supplied by the user or testee breathing in and out of the spirometer chamber or volume comparator 30, through the inlet 32. In the comparator the user's change in the volume of air is compared with the change in volume of air effected by the piston 33 of FIG. 2. Then the discrepancy or volume error between these two changes results in a pressure change which is transmitted to the pressure transducer, denoted by numeral 56 in FIG. 3. The resultant alternating current signal developed by the pressure transducer is demodulated and the direct current component thereof is passed through the differential mixer block 57 of FIG. 3, which is a portion of the electronic circuitry. Here the direct current component is amplified and transmitted to the control windings of the magnetic clutches 38 and 39 through the commutators from the brushes 44, 44 and 45, 45. The power from the motor 43 is taken off through the clutches 38, 39 to drive the piston 33. The direction of the piston motion is derived through the control circuitry such that the volume error will be driven to zero. In other words, when the user breathes an addition of air into the spirometer chamber or volume comparator 30, the piston will be backed off an appropriate amount to reduce the chamber pressure to its original value; thus the piston will accurately follow the volume changes from the user.

In order to gain more stability and a larger number of optimum characteristics, a tachometer feedback loop is provided around the piston and clutch portions of the diagram. The tachometer 47 signal is introduced into the differential mixer circuitry 57. This tachometer signal is a direct current signal proportional to the rate of piston displacement.

Also reading out the piston position is the potentiometer 49. The signal of the potentiometer is fed through the summing comparator 59 to become the major portion of the volume data 60. A correction is applied to the volume data from the pressure transducer output to the summing comparator. The reason for this correction is as follows. The complete servo position loop has a single integration. This integration is produced by the tachometer feedback around the double integration clutches. The resultant closed tachometer loop will produce a constant rate at the piston for a constant signal from the pressure transducer, thus it represents a single integration. It can therefore be seen that under a constant rate of volume change from the user, the piston will be required to move at an exactly equal rate. A relatively small volume error signal will therefore be required from the volume comparator. The magnitude of this volume error is inversely proportional to the loop gain. The data obtained from the potentiometer 49 under these conditions is in error by this amount. This error is removed by introducing at the summing comparator 59, a signal proportional to it, as obtained from the pressure transducer 56. Thus the total volume data has a zero error. The summing comparator 59 is an ordinary resistance network used for arithmetical operations, as described in "Electronic Instruments" by Greenwood, Holdam and MacRae, published by McGraw-Hill Book Company of New York, in 1948. Page 33, Figure 3.1 (A) illustrates the operation.

For certain measurements it is desirable to obtain the integral of the unidirectional movements of the piston. In order to accomplish this an integrator potentiometer 51 is coupled to the rack through a slip disc clutch. Movement only in the direction desired transfers through the disc. Movement in the opposite direction "slips" and is not measured. The output signal from this potentiometer 51 is the integrated volume data 61. The integrator potentiometer is coupled through the slip disc clutch which, for example, is part of the ordinary Reichert Ventilometer pen arrangement, well known in the art of spirometry which adds successive inspiratory excursions for a direct reading of minute ventilation, as described in the following reference: Reichert, P. and Roth, H.: The Ventilograph: An Improved Recording Ventilometer and Its Applications. Journal of Laboratory and Clinical Medicine. Vol. 25: Page 1091, (1940). The use of such a combination simplifies the measurement of the maximal breathing capacity of the testee by summing all of the volumes of air breathed in one direction, inhalation or exhalation.

The measurements of rate of change of volume are also available from the servo-spirometer. These are obtained basically from the tachometer signal, which is a measure of the piston rate of displacement. This signal is fed through the summing comparator 62 which is an ordinary resistance network, adapted for arithmetic operations, similar to summing comparator 59, described above, to become the major portion of the volume change rate data 63. Since a volume error exists under transient conditions, it therefore follows that a rate of change of volume error with respect to time exists under transient conditions, which is equal to the first derivative of the volume error with respect to time. The volume error is the output of the pressure transducer 56 in FIG. 3. The first derivative of the volume error with respect to time is obtained by feeding a portion of the output of the pressure transducer into the differentiator 64. This derivative is obtained by the differentiator 64 and added as a relatively small correction to the tachometer signal in the summing comparator to produce the volume change rate data 63. For construction principles of the differentiator, see "Vacuum Tube Circuits" by Lawrence Baker Arguimbau, published by John Wiley and Sons, Inc., New York, 1948. Figure 17 on page 142 shows a typical circuit and the theory of operation is discussed on pages 142, 143, and 144. Thus three ordinary electrical readout signals are available in suitable form for recording by ordinary laboratory recorders. These are the volume data 60 which is the electrical output of the summing comparator 59, the integrated volume data 61, which is the electrical output of the integrator potentiometer 51, and the volume change rate data 63, which is the electrical output of the summing comparator 62.

In operation, the first step is to absorb any imbalances in the system. We are here referring to imbalances existing in the transducer, the electronic circuitry or the clutch windings. These are absorbed by performing a setting of the pressure transducer which consists of moving the Schaevitz transformer core to a position such that no clutch torque is developed on the piston for zero pressure differential in the volume comparator.

In order to set the Schaevitz core at a zeroing position, the inlet 32 on the spirometer chamber is vented to the atmosphere, as is the pressure inlet 22 on the pressure transducer. The operator then rotates the adjusting screw 25, causing a relative flexing in the ends 23, 24 of the U-shaped portion 2. This flexing causes the transformer mount 5 to move axially of the core 17. On either side of the "zero" position, rotation of the adjusting screw will develop a rate of displacement of the piston, i.e. the piston will creep, or move along the chamber in one direction or the other. At the midpoint or "zero" position, the piston will remain still.

At this point the operator attaches the volume inlet 32 of the spirometer chamber 30 to the user or testee by means of a face mask in the customary manner.

When the user exhausts his lungs, breathing out and into the spirometer chamber, as the pressure in the chamber 30 begins to rise, the increasing pressure is transmitted through the spirometer pressure outlet 29, through the transducer pressure inlet 21 to the lower compartment 14 of the transducer chamber 11. Note that the compartment 14 and the chamber 30 form a closed system sealed from the atmosphere. Compartment 14 is sealed off by the neoprene seal 16; the chamber 30 is sealed off by the piston ring 34 on the piston 33.

The instantaneous rise in pressure bends the diaphragm 12 upward in FIG. 1. This moves the transformer core 17 upward, generating a signal in the Schaevitz windings, which is transmitted through the connections lying in the access channel 20. These connections transmit the signal to the differential mixer 57 of FIG. 3. The mixer amplifies the signal and furnishes power to the windings of the appropriate clutch through its brushes and commutator. The polarity of the signal determines which clutch receives the power from the mixer. In the instance cited, the increase of pressure in the chamber 30 will result in a power transmittal through the brushes 45 to the winding of clutch 39, which is maintained in constant rotation by the motor 43. The flow of power to the winding results in a proportional coupling of power to the pinion 37, which consequently rotates in a counter-clockwise sense. This rotation drives the piston rack gear 35 and its associated piston assembly to the right in FIG. 2. Movement to the right increases the effective volume of the volume comparator 30, decreasing the pressure in the chamber. Thus the piston 33 is always driven in that direction which will compensate for volume changes in the chamber, that is, in the proper direction to null the pressure differential to the zero setting of the pressure transducer.

Inhaling of air by the user from the spirometer chamber creates a drop in pressure which is reflected by a bending of the diaphragm downward in FIG. 1. Thus the Schaevitz develops a signal which is transmitted to the differential mixer, amplified and fed through the brushes 44 to the winding of clutch 38. Power is consequently coupled to pinion 36 and the rack gear 35 is driven to the left in FIG. 2, decreasing the effective volume of the chamber 30. Thus it has been shown that any pressure error developed in the chamber will be driven to zero by consequent appropriate movement of the piston 33. Thus the chamber is maintained at all times at atmospheric pressure, for the case cited, and the user breathes as if he were breathing into the atmosphere. We have unloaded the user's lungs and any measurements made do not affect the lung function being measured. Pressure errors under the transient conditions of normal breathing of approximately one millimeter of $H_2O$ are sufficient to drive the instrument. This means that extremely delicate pressure changes are sufficient to cause the instrument to follow the breathing pattern of the user.

When it is desired to measure the user's breathing characteristics against constant resistive loads, the system can be altered to maintain this pressure rather than atmospheric in the chamber. The resistive load is applied as a reference pressure, under zero power flow, through the pressure inlet 22 from the reference source. Under this condition the clutch 38 provides a constant torque and the piston moves to the left in FIGURE 2, to compress the air in the chamber 30 to the level established by the reference pressure applied. A similar procedure can be performed to apply a negative resistive load through a negative pressure.

Since the power to overcome the inertia of the instrument is supplied by the electric motor 43 of the servo-spirometer, as contrasted with the counterbalancing weight system of the ordinary spirometer, the servo-spirometer can be used to measure transient conditions of breathing, such as those conditions involved in breathing during exercise, coughing and the like. For the same reason, the servo-spirometer can measure lung characteristics of newly born infants, small animals such as mice, and patients whose lung function has been impaired. In all these cases the smaller capability of the lungs has not been sufficient to drive the ordinary spirometer.

If it be desired to provide a booster pump action to augment the patient's breathing, for instance when the patient is in an iron lung or when the patient requires anaesthesia, the servo-spirometer can be employed to supply the booster action. The patient's breathing pattern controls the feeding of air or anaesthesia to the patient's lungs. As the patient's breathing pattern changes, on a time basis, or in volume requirements, the rate at which the gases are supplied and the amounts of gases supplied vary in synchronization with the breathing pattern. The work of breathing into this instrument is supplied by the servo-spirometer, but the control of breathing remains with the patient.

The volume data is read out of the instrument as a summation of the signal of the potentiometer 49 and the relatively small correction signal derived from the pressure transducer. The rate of change of volume data is similarly read out of the instrument as a summation of the signal of the tachometer and the time derivative of the relatively small correction signal derived from the pressure transducer. Thus the schematic of FIG. 3 offers independently developed simultaneous readings of volume data and rate of change of volume data. For certain studies it is advantageous to have simultaneous readings of these related data in order to correlate analyses of lung function.

In FIG. 2 it has been shown that the chamber 30 is maintained at atmospheric pressure because the pressure transducer is connected to that chamber through inlet 29. If it is desired to have the user breathe through a resistive element such as an absorption tube for carbon dioxide yet not have him sense the presence of the resistance of the absorption tube, this can be accomplished in the following way: The resistive element is placed between the inlet 32 and the patient's face mask. An inlet for the pressure transducer is then provided on the user's side of the resistance. Thus the user's side of the resistance is maintained at atmospheric pressure and the chamber departs from atmospheric pressure by the amount necessary to overcome the resistance.

If an additional load, such as a mechanical kymograph is to be operated by the servo-spirometer it will be noted that the energy requirements of this load will also be supplied from the motor 43 rather than from the patient's lungs. Therefore, no undue concern need be paid to lowering the frictional level of such accessories before using them in conjunction with this instrument.

In the event that experiments are to be tried or studies to be made, in which it will be desired to divert the gases, for example, in a closed system measurement collecting the expired gases, a valving system is needed.

Figure 4:
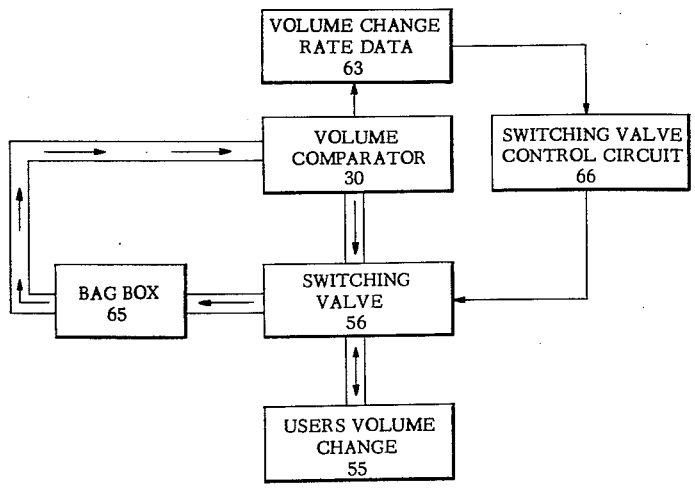
FIG. 4 is a schematic block diagram illustrating the flow of gas and the associated circuitry to control said flow in a variation of the servo-spirometer.

In FIG. 4 is shown a unique modification of the servo-spirometer which embodies an electrically-controlled system of valving to divert the flow of gases without creating a pressure drop. In most such measuring systems, valves are employed which are operated by a pressure drop. The energy to operate the valves in those measuring systems is a part of the energy drawn from the testee's lungs. With the modification shown in FIG. 4 signals which are developed as a function of rate of change of volume are employed to control the valving.

The user's volume change 55 which is a gas volume is passed through a switching valve 56 to the volume comparator 30, through the bag box 65. A proportional signal is read out as the volume change rate data 63. The readout is accomplished by the summation of the two circuit paths shown as a part of FIG. 3.

The bag box 65 is a chamber divided into two compartments by a loose-hanging membrane impermeable to gases. The gas flow path returns through a second inlet in the volume comparator 30 to the switching valve 56 to the user's volume change 55. The proper position of the switching valve 56 is determined by the switching valve control circuit 66 whose input is obtained from the volume change rate data, since the proper switching valve position is a function of the polarity of the volume change rate data.

If an experiment is begun with the volume comparator 30 filled with air at atmospheric pressure, the user can inhale air from the volume comparator and expire the carbon-dioxide-contaminated air into the bag box, so that the user is always inhaling fresh air. The size of the bag box can be made sufficiently large to accommodate the total volume of air expired in a relatively lengthy interval.

Although this invention has been disclosed and illustrated with reference to particular applications, the principles involved are susceptible of numerous other applications which will be apparent to persons skilled in the art. The invention is therefore, to be limited only as indicated by the scope of the appended claims.

We claim:

1. Volume and flow testing apparatus comprising a variable capacity air chamber for holding air to be inhaled and exhaled by the testee, a pressure transducer communicating therewith and generating a signal proportional to the pressure changes in said chamber from the inhalation and exhalation by the testee, a piston in said air chamber to vary its effective capacity, a rack gear integral with and driving said piston, a pair of pinion gears rotatable to control the movement of said rack gear and piston, a pair of magnetic clutches controlled by the proportional signal from said pressure transducer to control the driving of said pinion gears and the position of said rack and piston selectively in response to variations of pressure in the pressure transducer to compensate for said pressure variations produced by said testee in the variable capacity air chamber, and a constant speed electric motor in continuous operation to supply power to drive said pinion gears, rack and piston and an electrical circuit operating upon the output signal of the pressure transducer to selectively and proportionally energize one of the clutches to couple power from the electric motor to drive the rack and piston in such direction to compensate for variations of pressure detected by the pressure transducer.

2. Volume and flow testing apparatus comprising a variable capacity volume comparator having an inlet communicating with the facial mask of a testee, a control pressure transducer mounted upon and communicating with the volume comparator and generating a signal proportional to the pressure changes produced by said testee in said volume comparator, a piston reciprocably mounted in said volume comparator to vary its effective capacity, a rack gear integral with and driving said piston, a pair of pinion gears rotatable to drive said rack gear, a constant speed electric motor in continuous operation to supply power to drive said pinion gears and a pair of magnetic clutches operable by the proportional signal from said pressure transducer and mounted on said pinion gears to control the driving of said pinion gears by said motor and the position of said rack and piston compensatorily in response to variations of pressure produced by said testee in the volume comparator and an electrical circuit operating upon the proportional signal of the pressure transducer to selectively and proportionally energize one of the clutches to couple power from the electric motor to drive the rack gear and piston in such direction to compensate for variations of pressure detected by the pressure transducer.

3. Volume and flow testing apparatus comprising a variable capacity volume comparator connected to a closed system whose volume and flow rates are being tested, signal generator means responsive to produce a signal proportional to pressure changes produced in said volume comparator by changes in said closed system, a piston in said volume comparator to vary its capacity, a gear and clutch assembly to control the piston position in the comparator and the effective capacity of the comparator, clutch control means to compensatorily change the effective piston position within said volume comparator to compensate for changes in said closed system and a constant speed electric motor in continuous operation to supply power to drive said pinion gears, rack and piston through said clutch control means and an electrical circuit operating upon the proportional signal of the signal generator to selectively and proportionally energize the clutch control means to couple power from the electric motor to move the piston position in such direction as to compensate for pressure changes produced in said volume comparator.

4. Volume and flow testing apparatus comprising a variable capacity volume comparator connected to a closed system whose volume and flow rates are being tested, signal generator means generating an electrical signal proportional to pressure changes produced in said volume comparator by changes in said closed system, differential mixer means to receive the output of said signal generator means, a piston in said comparator to vary the effective volume of said volume comparator to compensate for changes in said closed system, gear and clutch assembly means cooperative with said piston to vary the position of said piston in said volume comparator, tachometer means cooperative with said gear assembly developing a signal proportional to the rate of piston displacement, said tachometer signal being summed in said differential mixer with the output of said signal generator means to control the piston position through said gear and clutch assemblies and a constant speed electric motor in continuous rotation to supply power to drive said gear and clutch assembly and said piston in response to signals generated by said tachometer and said signal generator and an electrical circuit operating upon the proportional signal from the signal generator means and the proportional signal from the tachometer means to selectively and proportionally energize the gear and clutch assembly means to couple power from the electric motor to vary the piston position in such direction as to compensate for the changes in said closed system.

5. Volume and flow testing apparatus comprising a variable capacity volume comparator connected to a closed system whose volume and flow rates are being tested, signal generator means responsive to pressure changes produced in said volume comparator by changes in said closed system and generating an electrical signal proportional to said pressure changes, differential mixer means receiving the output signal of said generator means, a piston to vary the pressure in said volume comparator, gear and magnetic clutch assembly means cooperative with said piston to vary the position of said piston in said volume comparator to compensate for volume changes in said closed system, tachometer means cooperative with said gear assembly developing a signal proportional to the rate of piston displacement, said tachometer output signal being added to the output of said signal generator means through said differential mixer means to provide control of the piston position through said gear and clutch assembly means, and a pressure-setting means on said signal generator means to establish the pressure in said volume comparator and said closed system, and motor means continuously operative to drive said gear and clutch assembly means and said piston and an electrical circuit operating upon the output signal of the generator means and the signal proportional to the rate of piston displacement to selectively and proportionally energize the clutch assembly means to couple power from the electric motor to vary the position of the piston in such direction as to compensate for pressure changes produced in the volume comparator.

6. Volume and flow testing apparatus comprising a variable capacity spirometer chamber provided with an inlet communicating with the facial mask of a testee, a pressure transducer assembly in the form of a relatively small chamber inletted to said spirometer chamber and communicating through said spirometer chamber with the facial mask of the testee, a metal diaphragm in said small chamber positionally responsive to pressure changes in said spirometer chamber produced by the testee and dividing said small chamber into two compartments, one compartment communicating with said spirometer chamber and also with the facial mask of the testee and the other compartment communicating with a pressure reference source, a linear variable differential transformer in said transducer assembly provided with a core integral with the center of said metal diaphragm, movement of said core and diaphragm in response to pressure changes produced by the testee generating a transformer output signal, differential mixer means fed the output signal of said transformer, a piston assembly to vary the pressure in said spirometer chamber to compensate for the pressure changes produced by the testee, gear and magnetic clutch assemblies to drive the piston reciprocably in said chamber, tachometer means on said gear assembly developing a signal proportional to the rate of piston displacement, said tachometer output signal being added to the output of said transformer in said differential mixer to provide control of the piston position through said gear and clutch means, and a pressure-setting control means on said pressure transducer to establish the pressure setting of the piston in said spirometer chamber and motor means operable to drive said gear and clutch assembly means and said piston and an electrical circuit operating upon the transformer output signal and the tachometer proportional signal to selectively and proportionally energize the clutch assemblies to couple power from the electric motor to vary the piston position in such direction as to compensate for pressure changes produced by the testee.

7. The combination as set forth in claim 6, but further characterized by a slip clutch and an integrator potentiometer driven unidirectionally by said gear and piston assemblies through said slip clutch to produce a signal proportional to unidirectional integrated volume data from position changes of said piston in said spirometer chamber.

8. The combination as set forth in claim 6, but further characterized in that a potentiometer is driven by said piston assembly to generate a signal proportional to the piston position in the spirometer chamber, a summing comparator fed by the piston position signal and the output signal of said transformer.

9. The combination as set forth in claim 6, but further characterized by a differentiator in which a differential signal is generated which is proportional to the rate of change of the output signal of said transformer, a volume change rate summing comparator in which is summed the tachometer output signal and the differentiator output signal.

10. Gas pressure compensating apparatus comprising a pressure comparator in the form of a cylinder having a variable capacity and connected to a closed gas system, a pressure transducer generating a signal proportional to the pressure changes produced in said comparator by pressure changes in said closed system, a piston reciprocatably mounted in said cylinder to vary the effective volume thereof, and thereby to compensate for pressure changes in said closed system, gear and clutch assemblies to vary the position of said piston controlled by the proportional signal of said pressure transducer, a constant speed electric motor in continuous operation to supply power to drive the gear and clutch assemblies and position said piston, tachometer means on said gear assembly developing a signal proportional to the rate of piston displacement, a differential mixer to add said tachometer output signal to the output signal of said pressure transducer and control the piston position through said gear and clutch assemblies, an electrical circuit operating upon the proportional signal of the pressure transducer and the output signal of the tachometer means to selectively and proportionally energize the clutch assemblies to couple power from the electric motor to vary the position of the piston in such direction as to compensate for pressure changes in said closed system and a pressure-setting control means on said pressure transducer to establish the pressure of the closed gas system and said comparator, said pressure-setting control means being in the form of a U-shaped body member, the upright portions of said member being pierced at their outermost extremities by threads of two different sizes and an adjusting screw threadably disposed through said upright portions, being composed of two threaded sections having different numbers of threads per unit of length to correspond to the two thread sizes in the pierced extremities of said upright portions of said U-shaped member.

References Cited in the file of this patent
UNITED STATES PATENTS

| | | |
|---|---|---|
| 2,593,774 | Loredo | Apr. 22, 1952 |
| 2,770,232 | Falk | Nov. 13, 1956 |
| 2,830,580 | Saklad | Apr. 15, 1958 |